(12) United States Patent
Hockemeyer et al.

(10) Patent No.: US 10,207,487 B1
(45) Date of Patent: Feb. 19, 2019

(54) SYSTEMS AND METHODS OF FORMING A COMPOSITE LAYUP STRUCTURE

(71) Applicant: General Electric Company, Schenectady, NY (US)

(72) Inventors: Matthew Harper Hockemeyer, Saratoga Springs, NY (US); James Bollacker, Scotia, NY (US); Shatil Sinha, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/861,311

(22) Filed: Jan. 3, 2018

(51) Int. Cl.
| | |
|---|---|
| *B32B 43/00* | (2006.01) |
| *B32B 38/10* | (2006.01) |
| *B32B 5/12* | (2006.01) |
| *C09J 7/38* | (2018.01) |
| *B32B 7/06* | (2006.01) |
| *B32B 7/12* | (2006.01) |
| *B29C 70/38* | (2006.01) |

(52) U.S. Cl.
CPC .............. *B32B 38/10* (2013.01); *B29C 70/38* (2013.01); *B32B 5/12* (2013.01); *B32B 7/06* (2013.01); *B32B 7/12* (2013.01); *C09J 7/381* (2018.01); *B32B 43/006* (2013.01); *Y10T 156/1174* (2015.01); *Y10T 156/195* (2015.01); *Y10T 156/1978* (2015.01)

(58) Field of Classification Search
CPC . B32B 38/10; B32B 43/006; Y10T 156/1174; Y10T 156/195; Y10T 156/1978
USPC ........................................ 156/715, 759, 764
See application file for complete search history.

(56) References Cited

U.S. PATENT DOCUMENTS

| | | | |
|---|---|---|---|
| 4,165,251 A * | 8/1979 | Matsumoto ............. | G03F 7/343 156/715 |
| 4,861,406 A | 8/1989 | Baker et al. | |
| 7,063,118 B2 | 6/2006 | Hauber et al. | |
| 7,846,288 B2 * | 12/2010 | Larson ................ | B29C 63/0013 156/247 |
| 8,221,575 B2 | 7/2012 | Krogager et al. | |

(Continued)

OTHER PUBLICATIONS

Bjornsson, Andreas et al., "Automated Removal of Prepreg Backing Paper—A Sticky Problem," Proceedings of the SAE 2013 Aerotech Congress and Exhibition, Sep. 24-26, 2013, Montreal Canada, 10 pp.

(Continued)

*Primary Examiner* — Mark A Osele
*Assistant Examiner* — Nickolas R Harm
(74) *Attorney, Agent, or Firm* — Peter A. Flynn; Ernest G. Cusick; Frank A. Landgraff

(57) ABSTRACT

A film separation system for use in separating a removable film adhered to a ply of material positioned on a work surface. The film separation system includes a holding member configured to hold the ply of material on the work surface, a movable arm configured to translate relative to the work surface, and a rotatable brush coupled to the movable arm. The movable arm is configured to translate the rotatable brush towards an edge of the ply of material, and the rotatable brush is oriented relative to the ply of material such that, when rotated, the rotatable brush is configured to bias the removable film away from the work surface, thereby creating a region of separation between the ply and the removable film.

20 Claims, 3 Drawing Sheets

(56) References Cited

U.S. PATENT DOCUMENTS

| | | |
|---|---|---|
| 8,424,583 B2 | 4/2013 | McCowin |
| 8,528,618 B2 | 9/2013 | Kisch et al. |
| 9,278,509 B2 | 3/2016 | Hou et al. |
| 9,358,770 B2 | 6/2016 | Dong et al. |
| 9,517,615 B2 | 12/2016 | Dong et al. |
| 2006/0118244 A1 | 6/2006 | Zaballos et al. |
| 2009/0025875 A1 | 1/2009 | Hagman |
| 2009/0032187 A1* | 2/2009 | Hiranaka ............. B32B 43/006 156/703 |
| 2013/0186574 A1* | 7/2013 | Baker ................... B32B 43/006 156/707 |
| 2014/0238617 A1 | 8/2014 | Shair et al. |

OTHER PUBLICATIONS

Lukaszewicz, Dirk et al., "The Engineering Aspects of Automated Prepreg Layup: History, Present and Future," Composites Part B: Engineering; vol. 43, Issue 3, Apr. 2012, pp. 997-1009.

Newel, G.C. et al., Modelling Flexible Sheets for Automatic Handling and Lay-up of Composite Components, Proceedings of the Institution of Mechanical Engineers, Part B: A Journal of Engineering Manufacture, vol. 209, Issue 6, Dec. 1, 1995, pp. 423-432.

* cited by examiner

SYSTEMS AND METHODS OF FORMING A COMPOSITE LAYUP STRUCTURE

BACKGROUND

The present disclosure relates generally to manufacturing composite structures and, more specifically, to systems and methods that facilitate automating at least one step of a composite manufacturing process.

Composite laminate components generally include a plurality of layers or plies of composite material assembled together to provide the composite component with improved engineering properties. Composite components are typically manufactured by stacking a plurality of plies on top of each other until a desired thickness and shape is achieved. For example, the manufacturing process typically includes cutting plies of composite material to a desired shape, stacking the plies layer by layer, and compacting the plies after each additional ply is layered over the previously stacked plies. The plies of composite material may be produced with a removable polyfilm that extends over at least one side of the plies, and that facilitates maintaining separation between stacked plies in storage. During manufacture of composite components, the polyfilm is removed from the plies of composite material before being installed as a layer in the composite component. Removing the polyfilm from each ply used to form the composite component can be a time-consuming and laborious task.

BRIEF DESCRIPTION

In one aspect, a film separation system for use in separating a removable film adhered to a ply of material positioned on a work surface is provided. The film separation system includes a holding member configured to hold the ply of material on the work surface, a movable arm configured to translate relative to the work surface, and a rotatable brush coupled to the movable arm. The movable arm is configured to translate the rotatable brush towards an edge of the ply of material, and the rotatable brush is oriented relative to the ply of material such that, when rotated, the rotatable brush is configured to bias the removable film away from the work surface, thereby creating a region of separation between the ply and the removable film.

In another aspect, a method of separating a removable film adhered to a ply of material positioned on a work surface is provided. The method includes holding the ply of material on the work surface, translating a rotatable brush towards an edge of the ply of material, and orienting the rotatable brush relative to the ply of material such that, when rotated, the rotatable brush is configured to bias the removable film away from the work surface, thereby creating a region of separation between the ply and the removable film.

In yet another aspect, a method of separating a removable film adhered to a ply of material is provided. The ply is positioned as an outermost layer of a layup structure. The method includes translating a rotatable brush towards an edge of the ply of material, and orienting the rotatable brush relative to the ply of material such that, when rotated, the rotatable brush is configured to bias the removable film away from the layup structure, thereby creating a region of separation between the ply and the removable film.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

Embodiments of the present disclosure relate to systems and methods that facilitate automating at least one step of a composite manufacturing process. More specifically, the system described herein includes a rotatable brush that initiates separation of a removable film from a ply of composite material. The rotatable brush may be affixed to a movable arm, a robotic device, or a gantry system, for example. In operation, the rotatable brush is translated towards an edge of the ply of composite material. The rotatable brush is oriented relative to the ply such that, when in motion, bristles of the rotatable brush contact the ply such that a region of separation is created between the ply and the removable film. Put another way, the rotatable brush repeatedly agitates the edge of the ply until a predetermined amount of separation is achieved. The region of initial separation enables the complete removal of the film in subsequent process steps. As such, the systems and methods described herein facilitate the manufacture of composite parts in a simplified, fast, and automated manner.

Figure 1:
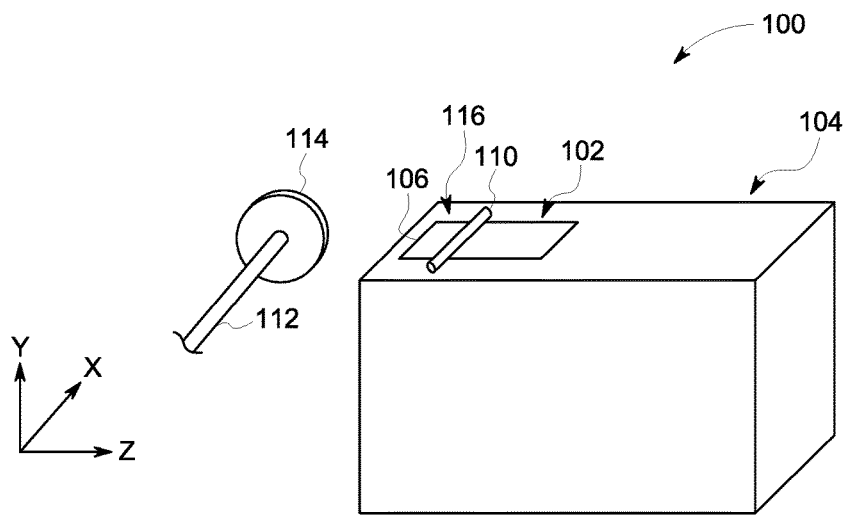
FIG. 1 is a perspective illustration of an exemplary film separation system.

FIG. 1 is a perspective illustration of an exemplary film separation system 100. In the exemplary embodiment, a ply 102 of material is positioned on a work surface 104. Ply 102 of material is oriented on work surface 104 such that an edge 106 of ply 102 is positioned on work surface 104. Alternatively, ply 102 is cantilevered on work surface 104 such that edge 106 overhangs therefrom. In some embodiments, ply 102 has a removable film 108 (not shown in FIG. 1) adhered thereto on at least one side thereof with an adhesive. In addition, an example material used to form ply 102 includes, but is not limited to, a carbon fiber reinforced polymer material.

Film separation system 100 includes a holding member 110, a movable arm 112, and a rotatable brush 114 coupled to movable arm 112. In the exemplary embodiment, holding member 110 holds ply 102 of material on work surface 104, and movable arm 112 translates rotatable brush 114 towards edge 106 of ply 102 of material, as will be explained in further detail below. In one embodiment, holding member 110 is sized, and oriented relative to ply 102 of material, such that a portion 116 of ply 102 proximate edge 106 is movable relative to holding member 110, such as when ply 102 is agitated by rotatable brush 114. In addition, as shown in FIG. 1, holding member 110 is embodied as a longitudinal rod that extends transversely across ply 102 and that biases against ply 102 with a predetermined retaining force. As such, holding member 110 facilitates holding ply 102 on work surface 104, and facilitates increasing the rigidity of portion 116 of ply 102, when ply 102 is agitated by rotatable brush 114. In an alternative embodiment, holding member 110 is embodied as any physical member capable of holding ply 102 on work surface 104 during a film removal process, such as a rod oriented in a normal direction relative to work surface 104, a rod having a polygonal cross-sectional shape, a physical member formed from foam or rubber, a strap, a set of vice-grip pliers, or other mechanism used in the art of mechanical machine element design for holding articles on a surface.

In the exemplary embodiment, movable arm 112 is translatable in at least one of the x-axis, the y-axis, or the z-axis (each shown in FIG. 1) relative to work surface 104. As a result, and as will be explained in further detail below, movable arm 112 translates rotatable brush 114 towards edge 106 of ply 102 of material during a film removal process, which enables rotatable brush 114 to act upon ply 102 of material. Movable arm 112 may be embodied as a movable component of any automated or mechanical system that enables film separation system 100 to function as described herein. For example, movable arm 112 may be embodied as a movable component of a robotic device, a gantry, or an x-y table.

Figure 2:
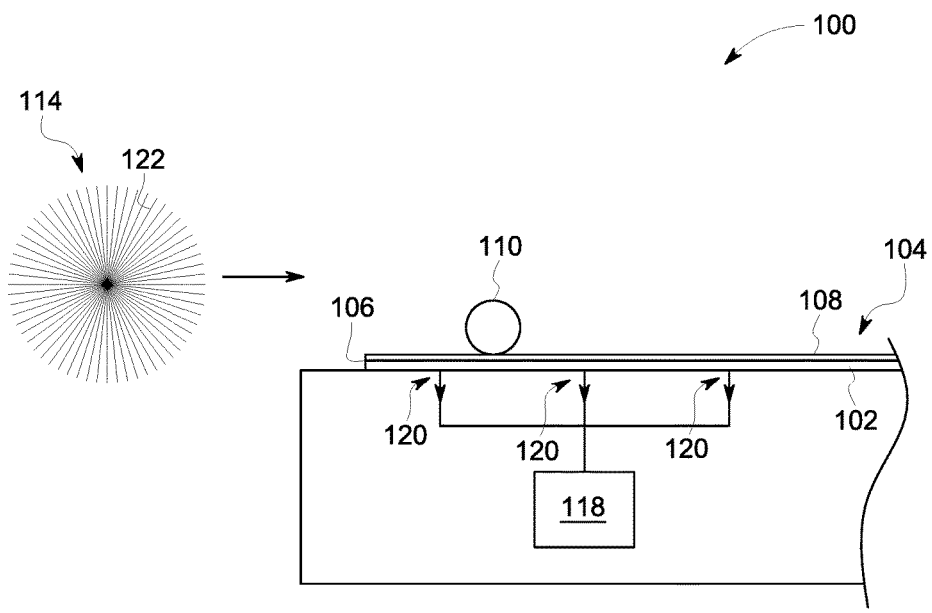
FIG. 2 is a side view illustration of the film separation system shown in FIG. 1.

FIG. 2 is a side view illustration of film separation system 100. In the exemplary embodiment, ply 102 of material has removable film 108 adhered thereto, which protects ply 102 from contamination during storage and transportation thereof, for example. Removable film 108 is formed from any material that enables film separation system 100 to function as described herein. In one embodiment, removable film 108 is formed from a flexible polymer-based material. Moreover, ply 102 of material is oriented on work surface 104 such that removable film 108 is positioned between ply 102 and holding member 110.

In the exemplary embodiment, film separation system 100 further includes a suction device 118 in flow communication with work surface 104. For example, work surface 104 has a plurality of openings 120 defined therein, and suction device 118 is operable to create a negative pressure at work surface 104 underneath ply 102 of material. As such, suction device 118 facilitates holding ply 102 flat against work surface 104 in portions of ply 102 not held down by holding member 110. Suction device 118 also facilitates restricting translation of ply 102 on work surface 104 when lateral forces are applied thereto, such as when peeling removable film 108 from ply 102, for example.

In the exemplary embodiment, rotatable brush 114 is formed from a plurality of bristles 122. Bristles 122 are formed from any material that enables film separation system 100 to function as described herein. For example, in one embodiment, bristles 122 are formed from material having a hardness less than that of carbon fiber reinforced polymer material. As such, the likelihood of damaging ply 102 when contacted by rotatable brush 114 is reduced.

As noted above, movable arm 112 (shown in FIG. 1) is configured to translate rotatable brush 114 towards edge 106 of ply 102 of material. More specifically, in operation, movable arm 112 translates rotatable brush 114 in a direction along the z-axis (shown in FIG. 1) towards edge 106 of ply 102. As will be explained in further detail below, rotatable brush 114 is then actuated and brought into contact with ply 102 to facilitate separating removable film 108 therefrom.

Figure 3:
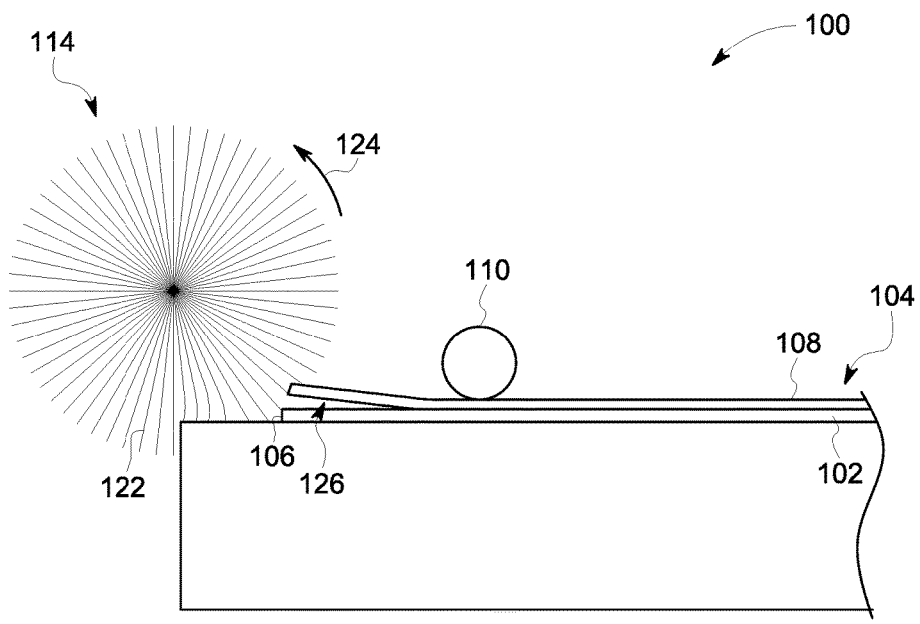
FIG. 3 is an enlarged side view illustration of the film separation system shown in FIG. 1 in a first operational mode.
Figure 4:
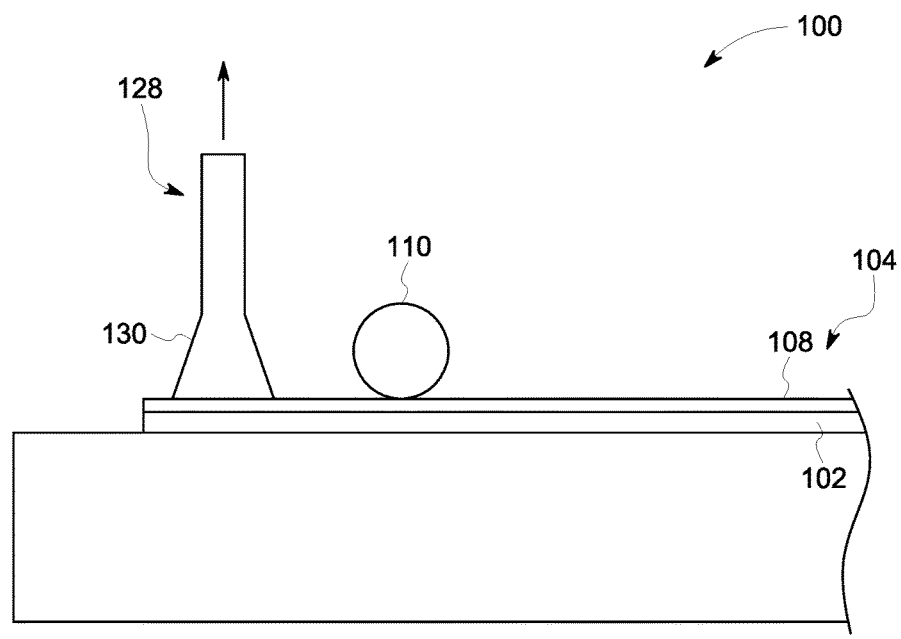
FIG. 4 is an enlarged side view illustration of the film separation system shown in FIG. 1 in a second operational mode.
Figure 5:
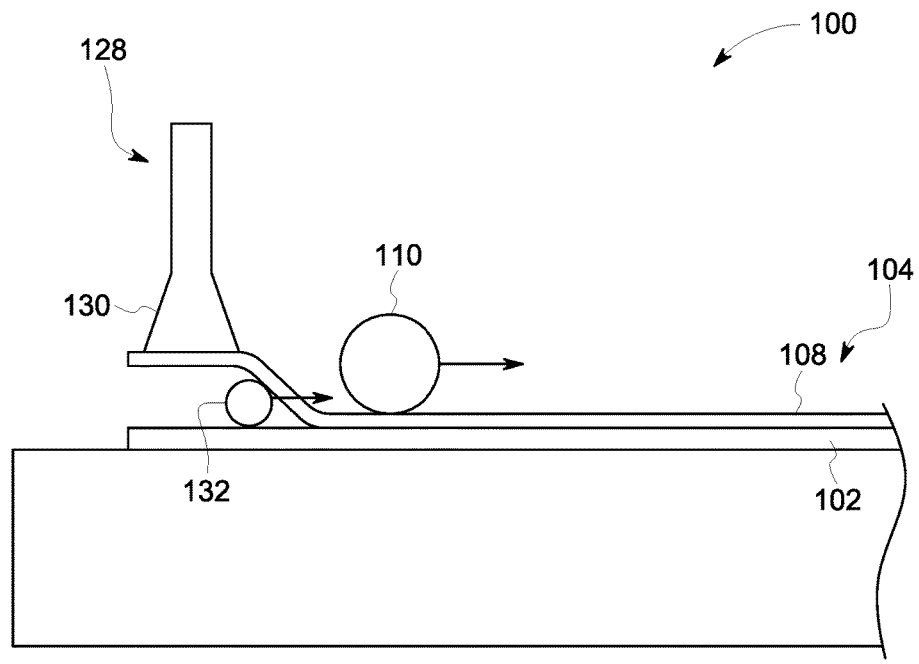
FIG. 5 is an enlarged side view illustration of the film separation system shown in FIG. 1 in a third operational mode.

FIGS. 3-5 are side view illustrations of the film separation system 100 in different modes of operation. Referring to FIG. 3, rotatable brush 114 is positioned at edge 106 of ply 102 of material, and rotatable brush 114 is rotated in a rotational direction 124. In the exemplary embodiment, rotatable brush 114 is oriented relative to ply 102 of material such that, when rotated, rotatable brush 114 biases removable film 108 away from ply 102 and from work surface 104. As a result, a region of separation 126 is created between ply 102 and removable film 108, which defines an initiation point for the subsequent separation of removable film 108 from ply 102. Rotatable brush 114 is also oriented such that, when contacting edge 106 of ply 102, ply 102 of material is oriented non-radially relative to rotatable brush 114. As such, bristles 122 of rotatable brush 114 engage ply 102 at an angle of attack that facilitates reducing the likelihood of damage being caused to ply 102 of material.

As noted above, removable film 108 is coupled to ply 102 of material with an adhesive. Although the adhesive remains between ply 102 and removable film 108, it is believed that creating region of separation 126 at least partially weakens the adhesive bond formed therebetween. As such, subsequent separation of removable film 108 from ply 102 is achievable even when rotatable brush 114 is no longer in contact with ply 102. Moreover, in some embodiments, region of separation 126 is enlarged by translating movable arm 112 in a direction, such as along x-axis (shown in FIG. 1), such that rotatable brush 114 traverses edge 106 of ply 102 of material.

Referring to FIG. 4, film separation system 100 further includes a gripper device 128 that grips removable film 108 at region of separation 126 (shown in FIG. 3). In the exemplary embodiment, gripper device 128 includes a suction head 130 that grips removable film 108 by forming a negative pressure at the interface between removable film 108 and suction head 130. For example, suction head 130 is in flow communication with a suction device (not shown) that facilitates forming the negative pressure at the interface. In an alternative embodiment, gripper device 128 is a physical gripping mechanism, such as a strip of velcro, a clothespin, a set of vice-grip pliers, or other mechanism used in the art of mechanical machine element design for gripping articles.

Referring to FIG. 5, gripper device 128 is translatable along at least one axis to facilitate separating removable film 108 from ply 102. In the exemplary embodiment, gripper device 128 translates away from work surface 104 along the y-axis (shown in FIG. 1) when gripping removable film 108. Moreover, film separation system 100 further includes a separation member 132 that is insertable between removable film 108 and ply 102 at region of separation 126. In operation, separation member 132 translates relative to ply 102 in a direction that propagates separation between ply 102 and removable film 108. For example, separation member 132 is translatable along the z-axis (shown in FIG. 1), and holding member 110 is likewise translatable along the z-axis simultaneously with separation member 132 such that the progress of separation member 132 is unimpeded by holding member 110.

Separation member 132 is any physical member that enables film separation system 100 to function as described herein. In one embodiment, separation member 132 is a longitudinal rod having a length greater than a width of ply 102 (i.e., the dimension of ply 102 in the x-axis (shown in FIG. 1)). As such, separation member 132 facilitates separating removable film 108 from ply 102 in a single motion when translated in the z-axis. In an alternative embodiment, separation member 132 is omitted from film separation system 100, and gripper device 128 is translatable in the z-axis to facilitate peeling removable film 108 from ply 102.

Figure 6:
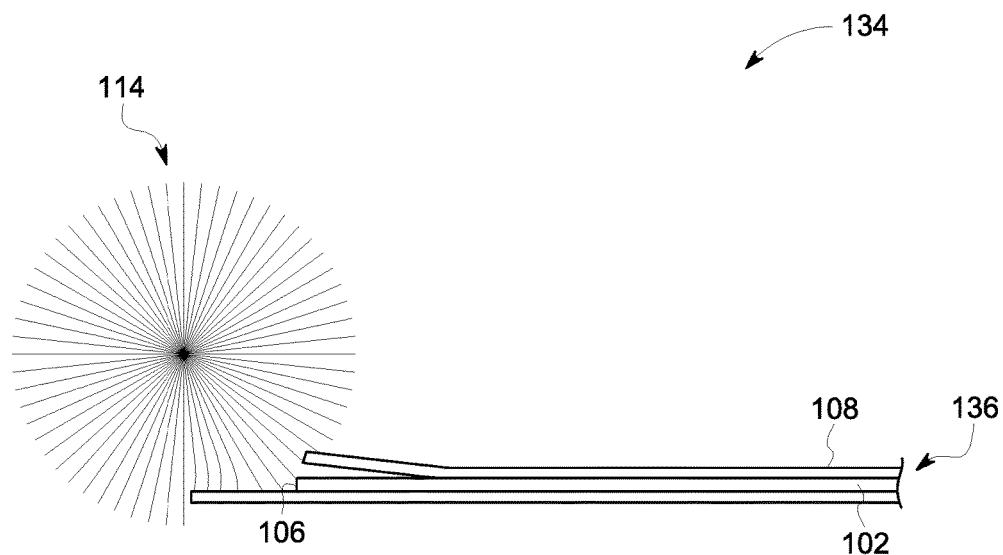
FIG. 6 is an enlarged side view illustration of an alternative film separation system.

FIG. 6 is an enlarged side view illustration of an alternative film separation system 134. In the exemplary embodiment, ply 102 of material is positioned as an outermost ply in a layup structure 136 formed from a plurality of plies of material. More specifically, ply 102 of material is positioned on layup structure 136 such that edge 106 of ply is positioned on layup structure 136. Removable film 108 may then be separated from ply 102 using rotatable brush 114 in a similar manner as that illustrated with respect to film separation system 100. Moreover, even though ply 102 is adhered to layup structure 136, holding member 110 (shown in FIG. 1) may be used to hold ply 102 against layup structure 136 to facilitate reducing the likelihood of delamination therebetween as ply 102 is agitated by rotatable brush 114.

An exemplary technical effect of the systems and methods described herein includes at least one of: (a) removing a polyfilm from a composite ply in a quick and efficient manner; (b) reducing the manufacturing time of a composite layup structure; and (c) providing means for automating a film removal process.

Exemplary embodiments of a film separation system and related method are provided herein. The systems and methods are not limited to the specific embodiments described herein, but rather, components of systems and/or steps of the methods may be utilized independently and separately from other components and/or steps described herein. For example, the configuration of components described herein may also be used in combination with other processes, and is not limited to practice with only removing a polyfilm from composite plies, as described herein. Rather, the exemplary embodiment can be implemented and utilized in connection with many applications where removing a film from a sheet of material is desired.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A film separation system for use in separating a removable film adhered to a ply of material positioned on a work surface, said film separation system comprising:
   a holding member configured to hold the ply of material on the work surface;
   a movable arm configured to translate relative to the work surface; and
   a rotatable brush coupled to the movable arm, wherein said movable arm is configured to translate said rotatable brush towards an edge of the ply of material, and wherein said rotatable brush is oriented relative to the ply of material such that, when rotated, said rotatable brush is configured to bias the removable film away from the work surface, thereby creating a region of separation between the ply and the removable film.

2. The system in accordance with claim 1 further comprising a separation member insertable between the removable film and the ply of material at the region of separation, wherein said separation member is configured to translate relative to the ply in a direction that propagates separation between the ply and the removable film.

3. The system in accordance with claim 2, wherein said holding member is configured to translate in the direction simultaneously with said separation member.

4. The system in accordance with claim 1 further comprising a gripper device configured to grip the removable film at the region of separation, wherein said gripper device is configured to translate away from the work surface when gripping the removable film.

5. The system in accordance with claim 1, wherein said holding member comprises a longitudinal rod, the longitudinal rod extending transversely across the ply.

6. The system in accordance with claim 1 further comprising a suction device in flow communication with the work surface, wherein the suction device is operable to create a negative pressure at the work surface underneath the ply of material.

7. The system in accordance with claim 1, wherein said movable arm is configured to translate in a direction such that the rotatable brush traverses the edge of the ply of material.

8. A method of separating a removable film adhered to a ply of material positioned on a work surface, said method comprising:
   holding the ply of material on the work surface;
   translating a rotatable brush towards an edge of the ply of material; and
   orienting the rotatable brush relative to the ply of material such that, when rotated, the rotatable brush is configured to bias the removable film away from the work surface, thereby creating a region of separation between the ply and the removable film.

9. The method in accordance with claim 8, wherein holding the ply of material comprises positioning a holding member over the ply of material such that the removable film is positioned between the ply and the holding member.

10. The method in accordance with claim 9, wherein positioning a holding member comprises positioning the holding member such that a portion of the ply of material proximate the edge is movable relative to the holding member.

11. The method in accordance with claim 8, wherein holding the ply of material comprises creating a negative pressure at the work surface.

12. The method in accordance with claim 8 further comprising orienting the ply of material on the work surface such that the edge of the ply is positioned on the work surface.

13. The method in accordance with claim 8, wherein orienting the rotatable brush comprises orienting the rotatable brush such that, when contacting the edge of the ply of material, at least one bristle of the brush engages the ply of material at an angle.

14. The method in accordance with claim 8, wherein translating a rotatable brush comprises traversing the edge of the ply of material with the rotatable brush.

15. The method in accordance with claim 8 further comprising:
   gripping the removable film at the region of separation; and
   peeling the removable film from the ply of material.

16. A method of separating a removable film adhered to a ply of material, the ply positioned as an outermost layer of a layup structure, said method comprising:
   translating a rotatable brush towards an edge of the ply of material; and
   orienting the rotatable brush relative to the ply of material such that, when rotated, the rotatable brush is configured to bias the removable film away from the layup structure, thereby creating a region of separation between the ply and the removable film.

17. The method in accordance with claim 16 further comprising orienting the ply of material on the layup structure such that the edge of the ply is positioned on the layup structure.

18. The method in accordance with claim 16, wherein orienting the rotatable brush comprises orienting the rotatable brush such that, when contacting the edge of the ply of material, at least one bristle of the brush engages the ply of material at an angle.

19. The method in accordance with claim 16, wherein translating a rotatable brush comprises traversing the edge of the ply of material with the rotatable brush.

20. The method in accordance with claim 16 further comprising:
   gripping the removable film at the region of separation; and
   peeling the removable film from the ply of material.

* * * * *